United States Patent [19]

Tozaki et al.

[11] 4,328,030
[45] May 4, 1982

[54] STEEL MAKING PROCESS AND APPARATUS

[75] Inventors: Yasuyuki Tozaki, Ibaraki; Minoru Ueda, Ohno; Takeyuki Hirata; Syoji Anezaki, both of Ibaraki, all of Japan

[73] Assignee: Sumitomo Metal Industries, Ltd., Osaka, Japan

[21] Appl. No.: 148,531

[22] Filed: May 9, 1980

[30] Foreign Application Priority Data

May 24, 1979 [JP] Japan .................................. 54/64223

[51] Int. Cl.³ ........................... C21C 5/32; C21C 5/34
[52] U.S. Cl. ........................................... 75/60; 75/59; 266/156; 266/217
[58] Field of Search ...................... 75/59, 60; 266/156, 266/217

[56] References Cited

U.S. PATENT DOCUMENTS

| | | | |
|---|---|---|---|
| 3,854,932 | 12/1974 | Bishop | 75/60 |
| 3,932,172 | 1/1976 | Knuppel | 75/60 |
| 3,940,263 | 2/1976 | Morello | 75/60 |
| 3,948,644 | 4/1976 | Maurice | 75/60 |
| 3,953,199 | 4/1976 | Michaelis | 75/60 |
| 4,089,677 | 5/1978 | Spenceley | 75/60 |
| 4,178,173 | 12/1979 | Gorges | 75/59 |

*Primary Examiner*—P. D. Rosenberg
*Attorney, Agent, or Firm*—Stevens, Davis, Miller & Mosher

[57] ABSTRACT

A process and apparatus for making steel in a basic oxygen furnace by the top-blowing of pure oxygen and the bottom-blowing of a gas mainly composed of carbon dioxide are disclosed, in which a waste gas discharged from said basic oxygen furnace is utilized as the only source of the gas to be blown into a molten metal.

6 Claims, 1 Drawing Figure

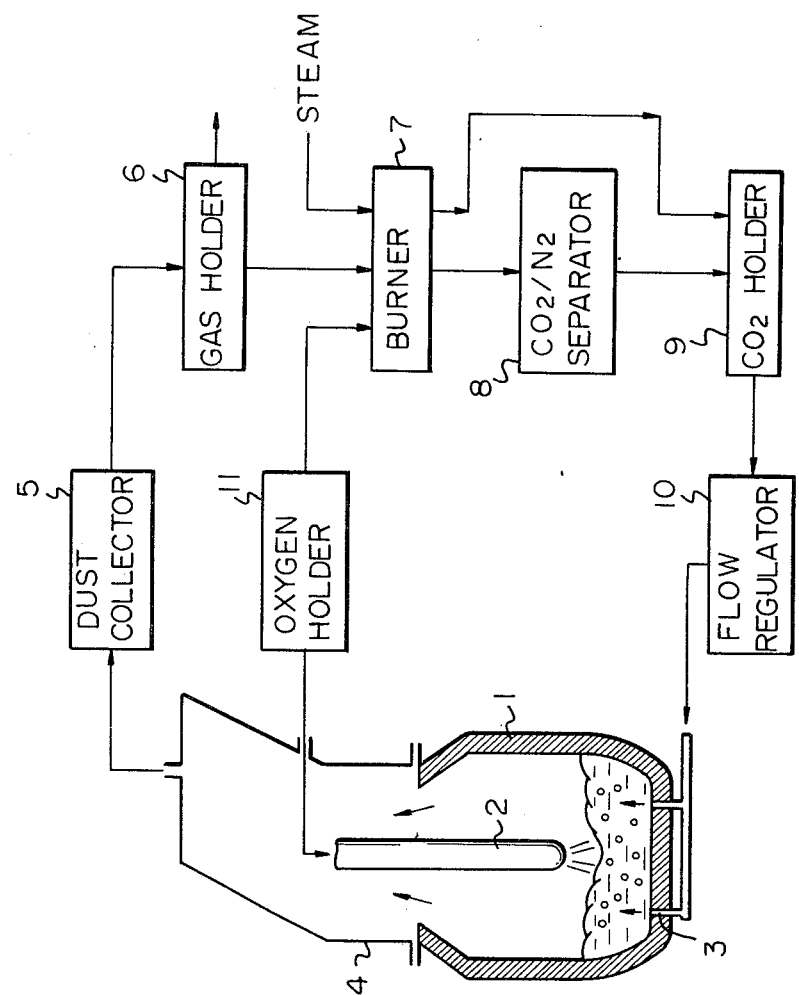

4,328,030

STEEL MAKING PROCESS AND APPARATUS

FIELD OF THE INVENTION

This invention relates to a steel making process and an apparatus therefor. The process of this invention enhances the force of agitating molten steel in oxygen top-blowing steel making by blowing a gas from below the bath. More particularly, this invention relates to a steel refining process that utilizes the waste gas from the furnace as the only source of the gas to be blown and which optionally denitrifies part of the recycled waste gas.

BACKGROUND OF THE INVENTION

The above mentioned method of refining steel with a bottom blowing basic oxygen furnace has already been proposed in the art. In summary, it consists of blowing a gas mainly composed of carbon dioxide from below the oxygen top-blowing furnace throughout the period of refining with top-blown oxygen or even up to, the time of tapping of steel following the refining operation.

BRIEF SUMMARY OF THE INVENTION

Noting the fact that oxygen gas is discharged primarily as carbon monoxide gas after the decarburizing operation in such oxygen top-blowing refining furnace, this invention, as its primary object, provides a steel refining process that utilizes said waste gas as the only source of the gas to be blown from below the melt bath to stir it. In so doing, the apparatus depends upon itself to supply a gas to stir the molten steel.

This invention resides in a process for making steel in a basic oxygen furnace by the top-blowing of pure oxygen and the bottom-blowing of a gas mainly composed of carbon dioxide, characterized in that a waste gas discharged and collected from said furnace is combined with additional oxygen and/or steam, the mixture thereof is burned, and the resulting combustion gas mainly composed of carbon dioxide is used as at least a part of the bottom-blowing gas.

Since the combustion gas sometimes contains a relatively large amount of nitrogen gas, it is preferable to remove the nitrogen gas, or to collect carbon dioxide from the combustion gas so as to provide the bottom-blowing gas rich in carbon dioxide. The removal of nitrogen gas from the combustion gas is preferably carried out when low-nitrogen steel is to be produced.

This invention also resides in a steel making apparatus having a gas circulation system, comprising, in combination, a basic oxygen furnace permitting both top-blowing of oxygen and bottom-blowing of carbon dioxide-rich gas, a device for collecting the waste gas generated from the furnace, a device for burning said gas with oxygen and/or steam, an optional device for separating the combustion gas into carbon dioxide and nitrogen, and a piping system for supplying the molten steel in the furnace with carbon dioxide generated from said burner and separator.

This invention is particularly applicable to produce carbon steel, such as rimmed steel, killed steel, etc., and low-alloy steel. More particularly, this invention provides satisfactory method of producing low-carbon steel, such as carbon steel containing less than 0.3% C.

BRIEF DESCRIPTION OF THE DRAWING

The accompanying drawing is a schematic diagram illustrating the arrangment of the steel making apparatus according to this invention.

PREFERRED EMBODIMENT OF THE INVENTION

The apparatus of this invention is now described by reference to the accompanying drawing. In the drawing, an oxygen steel furnace 1 has an oxygen top-blowing lance 2 and a series of gas bottom-blowing nozzles 3. Oxygen gas is blown from the top-blowing lance 2 into the furnace 1 to perform decarburization and is discharged primarily as carbon monoxide gas. A gas consisting primarily of carbon dioxide is jetted from the bottom-blowing nozzles 3 into the furnace 1 where it is decomposed following the course $C+CO_2 \rightarrow 2CO$ and discharged from the furnace. These two supplies of carbon monoxide gas are caught in a hood 4 on top of the furnace 1. They contain less than 20 vol% of nitrogen gas since they are mixed with air as they are being caught in the hood.

The gas caught in the hood 4 is first freed of dust through a dust collector 5 and transferred to a gas holder 6 where it is stored temporarily before proceeding to subsequent treatments. The gas in the holder 6 is mixed with oxygen and/or steam prior to entering into a burner 7. The gas in the holder 6 may be burnt with oxygen coming from an oxygen holder 11 for supplying oxygen to the oxygen top-blowing lance 2, and is optionally dehumidified before it is transferred to a carbon dioxide holder 9, or after the burning, the gas may be denitrified in a $CO_2/N_2$ separator 8 (or $H_2$ separator) to increase the $CO_2$ content before it is transferred to the carbon dioxide holder 9.

The carbon dioxide transferred to its holder 9 is supplied to the gas bottom-blowing nozzle 3 through the flow regulator 10. Alternatively, it may be combined with untreated gas from the gas holder 6 before it is supplied to the nozzle 3.

The gas jetted from the bottom-blowing nozzle 3 into the bath is again caught in the hood 4 together with the carbon monoxide resulting from decarburization. Thus, each supply of carbon monoxide gas and carbon dioxide gas keeps recycling through the path described above.

This invention is now described by reference to one embodiment of refining operation using the apparatus of this invention described above.

EXAMPLE

The steel making apparatus comprised a 250-ton oxygen top-blowing converted provided with four bottom-blowing nozzles and the gas circulation system comprising the components described above in conjunction with the FIGURE. The refining conditions were as follows: the molten iron consisted of 4.63% C, 0.51% Si, 0.43% Mn, 0.115% P, 0.23% S and the remainder Fe; the melt temperature was 1358° C., the hot metal ratio was 87%, and 3.5t of iron ore was charged together with auxiliary materials composed of 11t of quick lime and 8t of dolomite. The supply rate of top-blown oxygen was 40,000 $Nm^3/hr$. The waste gas recovered through the above circulation system was burnt, denitrified, and supplied at a flow rate of 1,500 $Nm^3/hr$ as a bottom-blown gas that consisted of 98.5 vol% $CO_2$ and 1.5 vol% $N_2$. The refining pattern was adapted for the production of low-carbon rimmed steel;

that is, oxygen was blown in the same manner as in the conventional method whereas a constant flow of bottom-blown gas was supplied up to the time of start of tapping.

The results of the refining were: a waste gas consisting of 71.1 vol% CO, 15.2 vol% $CO_2$, 10.5 vol% $N_2$ and 3.2 vol% $H_2O$ could be recovered from the furnace in a quantity of 108,000 $Nm^3$/hr. The steel obtained had a final analysis of 0.058% C, 0.01% Si, 0.11% Mn, 0.018% P, 0.020% S, 0.0011% N and the remainder Fe, and its temperature was 1628° C. This indicates the fact that refining operations such as decarburization and denitrification were adequate for the making of the desired steel.

As described in the foregoing, the apparatus of this invention may supply almost all of the gas to be blown from below the furnace by treating the waste gas recovered from the furnace. Therefore, this invention provides a steel making process more economical than the process that depends on an external source of bottom-blown gas. In addition, this invention uses carbon monoxide gas that is the primary component of the waste gas, and so, it is markedly advantageous and very simple in respect of cost, equipment and handling.

What is claimed is:

1. A process for making carbon steels and low alloy steels in a basic oxygen furnace by the top-blowing of pure oxygen and the bottom-blowing of a gas predominantly comprising carbon dioxide, which comprises collecting a waste gas discharged from said basic oxygen furnace, combining the waste gas with at least one gas selected from the group consisting of oxygen and steam, burning the mixture thereof, recovering the resulting combustion gas comprising at least 50% carbon dioxide gas, and blowing it into the molten metal as at least a portion of the bottom-blowing gas, while top-blowing pure oxygen.

2. A process as defined in claim 1, in which carbon dioxide is removed from the combustion gas and is blown into the molten metal as at least a portion of the bottom-blowing gas.

3. An apparatus for making carbon steels and low alloy steels having a gas circulation system, which comprises, in combination, a furnace permitting both top-blowing of pure oxygen and bottom-blowing of a gas predominantly comprising carbon dioxide, means for mixing the waste gas with at least one gas selected from the group consisting of oxygen and steam, means for burning the mixture thereof, and means for passing the resulting combustion gas comprising at least 50% carbon dioxide gas through a piping system to inject it into the molten metal within said furnace.

4. A steel making apparatus as defined in claim 3, which further comprises a means for separating carbon dioxide from the combustion gas, the separated carbon dioxide being injected into the molten metal as at least a portion of the bottom-blowing gas.

5. The process of claim 1, wherein the recovered combustion gas consists essentially of carbon dioxide.

6. The apparatus of claim 3, wherein the recovered combustion gas consists essentially of carbon dioxide.

* * * * *